(12) United States Patent
Kimura et al.

(10) Patent No.: US 9,546,481 B2
(45) Date of Patent: Jan. 17, 2017

(54) VACUUM INSULATION MATERIAL

(71) Applicant: Samsung Electronics Co., Ltd, Suwon-si, Gyeonggi-do (KR)

(72) Inventors: Mitsuharu Kimura, Yokohama (JP); Hideki Imamura, Yokohama (JP); Kenichi Nagayama, Yokohama (JP)

(73) Assignee: SAMSUNG ELECTRONICS CO., LTD. (KR)

( * ) Notice: Subject to any disclaimer, the term of this patent is extended or adjusted under 35 U.S.C. 154(b) by 24 days.

(21) Appl. No.: 14/562,075

(22) Filed: Dec. 5, 2014

(65) Prior Publication Data
US 2015/0159800 A1 Jun. 11, 2015

(30) Foreign Application Priority Data

Dec. 6, 2013 (JP) .................. 2013-253445
Nov. 27, 2014 (KR) .......... 10-2014-0167435

(51) Int. Cl.
*F16L 59/065* (2006.01)
*E04B 1/78* (2006.01)
(Continued)

(52) U.S. Cl.
CPC . *E04B 1/78* (2013.01); *B32B 3/04* (2013.01); *B32B 5/022* (2013.01); *B32B 15/08* (2013.01); *B32B 27/12* (2013.01); *B32B 27/34* (2013.01); *B32B 27/36* (2013.01); *B32B 2262/062* (2013.01); *B32B 2307/302* (2013.01); *B32B 2307/304* (2013.01); *B32B 2307/7242* (2013.01); *B32B 2509/00* (2013.01);
(Continued)

(58) Field of Classification Search
CPC ...... Y10T 428/231; F16L 59/065; E04B 1/803
See application file for complete search history.

(56) References Cited

U.S. PATENT DOCUMENTS 5,600,957 A    2/1997  Manini et al.
7,571,582 B2   8/2009  Hirai et al.
(Continued)

FOREIGN PATENT DOCUMENTS

EP    1697671     8/2010
JP    08285175    11/1996
(Continued)

OTHER PUBLICATIONS

US 8,845,046, 09/2014, Nomura et al. (withdrawn)
(Continued)

*Primary Examiner* — Alexander Thomas
(74) *Attorney, Agent, or Firm* — Cantor Colburn LLP

(57) ABSTRACT

A vacuum insulation material includes a pair of gas barrier exterior materials, a core material including a cellulose structure having porosity of greater than or equal to about 80% under reduced pressure of about 1 Pa, where the cellulose structure has a unit length of greater than or equal to about 1 μm and less than or equal to about 5 mm in the heat-insulation direction, and the method of manufacturing the same, and a gas adsorption agent, where the core material and the gas adsorption agent are interposed between the pair of gas barrier exterior materials and sealed inside of the pair of gas barrier exterior materials under reduced pressure.

7 Claims, 4 Drawing Sheets

(51) Int. Cl.
*B32B 5/02* (2006.01)
*B32B 15/08* (2006.01)
*B32B 27/12* (2006.01)
*B32B 27/34* (2006.01)
*B32B 27/36* (2006.01)
*B32B 3/04* (2006.01)
*E04B 1/80* (2006.01)

(52) U.S. Cl.
CPC ............ *B32B 2509/10* (2013.01); *E04B 1/803* (2013.01); *Y10T 428/231* (2015.01)

(56) References Cited

U.S. PATENT DOCUMENTS

| | | | |
|---|---|---|---|
| 7,947,347 B2 | 5/2011 | Takashima et al. | |
| 2009/0060961 A1 | 3/2009 | Naruse et al. | |
| 2012/0114896 A1* | 5/2012 | Jung | F16L 59/065 428/69 |
| 2012/0286189 A1* | 11/2012 | Barthel | C04B 30/00 252/62 |

FOREIGN PATENT DOCUMENTS

| | | |
|---|---|---|
| JP | 09512088 | 12/1997 |
| JP | 11325386 A | 11/1999 |
| JP | 2001099392 | 4/2001 |
| JP | 2006043604 | 2/2006 |
| JP | 2007070792 | 3/2007 |
| JP | 2007514810 | 6/2007 |
| JP | 4012903 | 9/2007 |
| JP | 2008232372 | 10/2008 |
| JP | 2010215872 | 9/2010 |
| JP | 2012041687 | 3/2012 |
| JP | 2012092870 | 5/2012 |
| KR | 1020050016490 | 2/2005 |
| KR | 1020130015960 | 2/2013 |
| WO | 2007010949 | 1/2007 |
| WO | 2010073762 | 7/2010 |

OTHER PUBLICATIONS

Jae-Sung Kwon et al., "International Journal of Heat and Mass Transfer", International Journal of Heat and Mass Transfer, vol. 52, pp. 5525-5532, 2009.

* cited by examiner

VACUUM INSULATION MATERIAL

RELATED APPLICATIONS

This application claims priority to Japanese Patent Application No. 10-2013-0253445 filed on Dec. 6, 2013, and Korean Patent Application No. 10-2014-0167435 filed on Nov. 27, 2014, and all the benefits accruing therefrom under 35 U.S.C. §119, the contents of which in its entirety is herein incorporated by reference.

BACKGROUND

1. Field

Exemplary embodiments of the invention relate to a vacuum insulation material. Particularly, exemplary embodiments relate to a vacuum insulation material having low thermal conductivity and in which a reduction of thermal conduction in an unfavorable direction effectively occurs during heat insulation thereof by pores in the heat-insulation direction.

2. Description of the Related Art

A vacuum insulation material is typically obtained by vacuum-packaging a core material or a gas adsorption agent in a gas barrier exterior material and suppresses thermal conduction by maintaining the inside thereof under vacuum. The vacuum insulation material has been used in an electrical product such as a freezer, a refrigerator, a warmer cabinet, a vending machine, a house wall material, or the like due to the low thermal conductivity thereof.

A glass fiber has been generally used as a core material in the conventional vacuum insulation material. The glass fiber may be scattered during the manufacture thereof or during manufacturing or dissembling of a vacuum insulation material including the glass fiber, and may adversely influence a human body, for example, through a worker's inhalation, skin irritation, or the like.

Accordingly, techniques using a thin plate-shaped cellulose structure as a core material of a vacuum insulation material have been developed in recent.

SUMMARY

A conventional method of manufacturing a cellulose structure may include compressing a thin plate-shaped cellulose structure into a paper shape and heating and drying the thin plate-shaped cellulose structure. In such a conventional manufacturing method, the cellulose fibers may be too closely bonded by a hydrogen bond during the drying process to ensure porosity.

A conventional heat-insulation material may include an organic fiber having high porosity and a low environmental load, which is manufactured by lyophilizing a fiber dispersion to provide a sponge-shaped structure. However, in such a conventional heat-insulation material, the direction of fiber arrangement is irregular, and one fiber lump after the lyophilization is used as a core material, such that heat may be conducted in an unfavorable direction, which is a thickness direction of the heat-insulation material, during the heat insulation.

Exemplary embodiments of the invention are directed to an improved vacuum insulation material, and more particularly, to a vacuum insulation material having low thermal conductivity and in which the thermal conduction in an unfavorable direction is reduced during the heat insulation.

In exemplary embodiments, the vacuum insulation material is improved by providing a cellulose structure having high porosity and a predetermined range of unit length in a heat-insulation direction and using such a cellulose structure as a core material.

In an exemplary embodiment, a vacuum insulation material includes a pair of gas barrier exterior materials, a core material including a cellulose structure having porosity of greater than or equal to about 80% under reduced pressure of about 1 pascal (Pa), where the cellulose structure has a unit length of greater than or equal to about 1 micrometer ($\mu$m) and less than or equal to about 5 millimeters (mm) in the heat-insulation direction, and a gas adsorption agent, where the core material and the gas adsorption agent are interposed between the pair of gas barrier exterior materials and sealed inside of the pair of gas barrier exterior materials under reduced pressure.

According to exemplary embodiments, a vacuum insulation material having low thermal conductivity and effectively reducing the thermal conduction in the unfavorable direction during the heat insulation is provided.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1A:
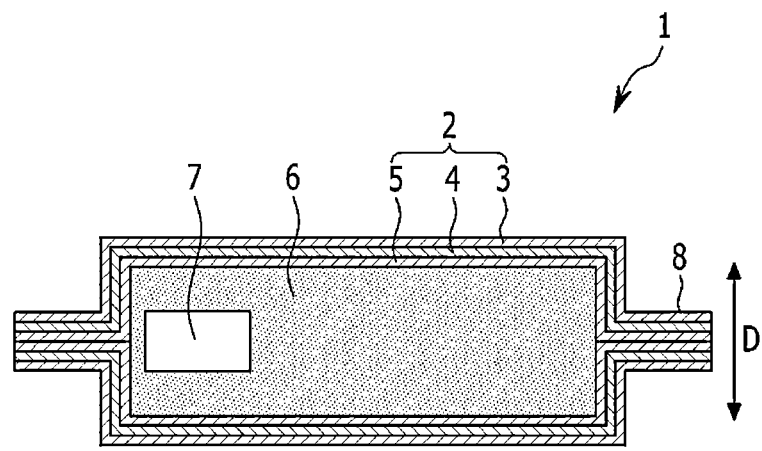
FIGS. 1A and 1B are schematic cross-sectional views showing exemplary embodiments of a vacuum insulation material according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An embodiment of the invention relates to a vacuum insulation material in which a core material and a gas adsorption agent are interposed between opposing surfaces of a pair of gas barrier exterior materials and sealed under a reduced pressure, where the core material includes a cellulose structure having porosity of greater than or equal to about 80% under the reduced pressure of about 1 pascal (Pa), and where the cellulose structure has a unit length of greater than or equal to about 1 micrometer (μm) and less than or equal to about 5 millimeters (mm) in a heat-insulation direction (e.g., a predetermined direction in which the thermal conduction is effectively blocked or substantially lowered when using the heat-insulation material). Herein, the reduced pressure may be defined as a pressure lower than the lowest atmospheric pressure on the earth's surface, e.g., in a range of about 0.1 Pa to about 3,000 Pa.

According to such an embodiment, as described above, a core material of the vacuum insulation material includes a cellulose structure having porosity of greater than or equal to about 80% under the reduced pressure of about 1 Pa, and the cellulose structure has a unit length of greater than or equal to about 1 μm and less than or equal to about 5 mm in the heat-insulation direction. Accordingly, in such an embodiment, the thermal conductivity of the vacuum insulation material is substantially decreased, and the thermal conduction in the vacuum insulation material may be effectively decreased in the unfavorable direction during the heat insulation. In such an embodiment, where the core material includes cellulose, the vacuum insulation material may be efficiently handled with low environmental loading properties. The mechanisms of providing the heat insulation and simultaneously decreasing the thermal conduction in the unfavorable direction may be as follows, but are not limited thereto.

As a fiber is generally irregularly arranged in a core material having high porosity obtained by the lyophilization or the like, heat may be conducted in the unfavorable direction during the heat insulation. In one exemplary embodiment, for example, the core material in which a cellulose fiber, the pathway of thermal conduction, is isotropically arranged is enclosed in one sheet or a block of exterior material, so the thermal conduction of the heat-insulation material itself becomes isotropic. On the other hand, according to such an embodiment, the core material includes a cellulose structure having porosity of greater than or equal to about 80% under the reduced pressure of about 1 Pa and having a unit length of greater than or equal to about 1 μm and less than or equal to about 5 mm in the heat-insulation direction (a predetermined direction in which the thermal conduction is effectively blocked or substantially lowered when using the heat-insulation material). By using the form, the thermal conduction in the heat-insulation direction may be blocked by pores provided in cellulose structures. Accordingly, in such an embodiment, where the core material includes a cellulose structure having high porosity and a predetermined unit length range in the heat-insulation direction, the heat transported through fibers in the heat-insulation direction may be substantially reduced, and the thermal conductivity of the vacuum insulation material may be lowered and simultaneously the thermal conduction may be effectively suppressed and/or effectively prevented in a predetermined direction, e.g., the unfavorable direction, during the heat insulation by such a core material.

Accordingly, an exemplary embodiment of the vacuum insulation material according to the invention may have low thermal conductivity and simultaneously effectively reduce the thermal conduction in the unfavorable direction during the heat insulation, and thereby may be used as a vacuum insulation material of a freezer, a refrigerator, or the like.

Hereinafter, exemplary embodiments of the invention will be described in detail with reference to the accompanying drawings.

However, the invention should not be construed as being limited to the exemplary embodiments set forth herein. Rather, these exemplary embodiments are provided so that this disclosure will be thorough and complete and will fully convey the concept of the present invention to those skilled in the art.

Herein, "a value of X-Y" means "a value greater than or equal to X and less than or equal to Y", and "weight" and "mass", "weight percent (wt %)" and "mass percent (mass %)", and "parts by weight" and "parts by mass" are considered as synonyms of each other.

Herein, unless defined otherwise, the operating and measuring properties and the like are performed under the conditions of room temperature of 20° C.-25 degrees Celsius (° C.) and relative humidity of 40%-50%.

Hereinafter, exemplary embodiments of vacuum insulation material will be described in detail.

Figure 1B:
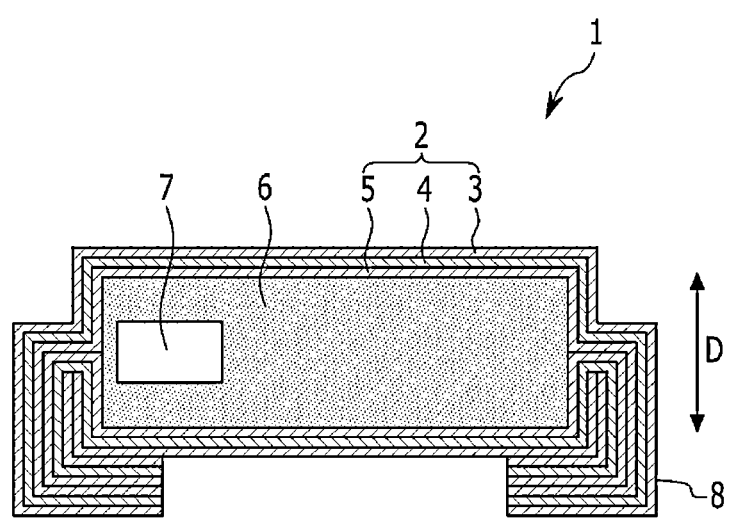

FIGS. 1A and 1B are schematic cross-sectional views showing exemplary embodiments of a vacuum insulation material according to the invention.

In an exemplary embodiment, as shown in FIG. 1A, the vacuum insulation material 1 has a structure in which a core material 6 and a gas adsorption agent 7 are interposed between two opposing surfaces of two sheets of exterior materials 2. The exterior material 2 may be a laminate structure (e.g., laminate film) of a metal foil 4 and polymer films 3 and 5. In an exemplary embodiment of the vacuum insulation material 1, as shown in FIG. 1, the heat-insulation direction D may be a thickness direction thereof, e.g., a vertical direction shown in FIG. 1A.

As described above, the core material includes a cellulose structure having high porosity and a predetermined-ranged unit length in a heat-insulation direction, such that the cellulose structure may reduce the heat transported through fibers in the heat-insulation direction. Accordingly, the thermal conductivity of the vacuum insulation material 1 may be decreased by the core material, and simultaneously, the thermal conduction in the vacuum insulation material 1 may be effectively suppressed and/or effectively prevented in the unfavorable direction during the heat insulation.

The vacuum insulation material 1 may be obtained by sealing (for example, heat sealing) the peripheral part of the laminate film to provide an envelope-shaped exterior material 2, accommodating the core material 6 and the gas adsorption agent 7 in the exterior material 2, depressurizing the inside thereof, and sealing (for example heat sealing) the opening. In an exemplary embodiment, as shown in FIG. 1, the peripheral part (terminal part) of the exterior material (laminate film) 2 has a bonding part (seal part) 8 where the exterior materials (laminate film) 2 are attached to each other. In an alternative exemplary embodiment, the bonding part 8 may be folded to the side of the main body of the vacuum insulation material to provide a vacuum insulation product, as shown in FIG. 1 B.

Hereinafter, each member of an exemplary embodiment of the vacuum insulation material according to the invention will be described in greater detail. In such an embodiment, as described above, the core material of the vacuum insulation material includes a cellulose structure having porosity of greater than or equal to about 80% under the reduced pressure of about 1 pascal (Pa), and the cellulose structure has a unit length of greater than or equal to about 1 μm and less than or equal to about 5 mm in a heat-insulation direction, and the vacuum insulation material may further include any conventional members.

In an exemplary embodiment, the core material may function as a bone structure of a vacuum insulation material to provide a vacuum space therein. In an exemplary embodiment, the core material includes a unit of cellulose structure including cellulose obtained from wood pulp or the like, for example. In such an embodiment, the cellulose structure may further include an organic fiber, for example, a natural fiber such as cotton, hemp, wool, and silk, a recycled fiber such as rayon, a semi-synthetic fiber such as acetate, and the like. The core material including such materials has high elasticity of the fiber itself and low thermal conductivity of the fiber itself, and is industrially inexpensive.

In an exemplary embodiment, the thermal conductivity of the vacuum insulation material may be generally classified into solid thermal conductivity based on transporting heat through a joint of contact between fibers, and a gas thermal conductivity based on transporting heat through gas thermal movement of gas present in the pores among fibers. In such an embodiment, the contact area between fibers of the cellulose structure may be reduced to reduce the solid thermal conductivity, and the vacuum degree may be increased or the porosity may be increased by using an aligning fiber having high strength to reduce the gas thermal conductivity.

Figure 3:
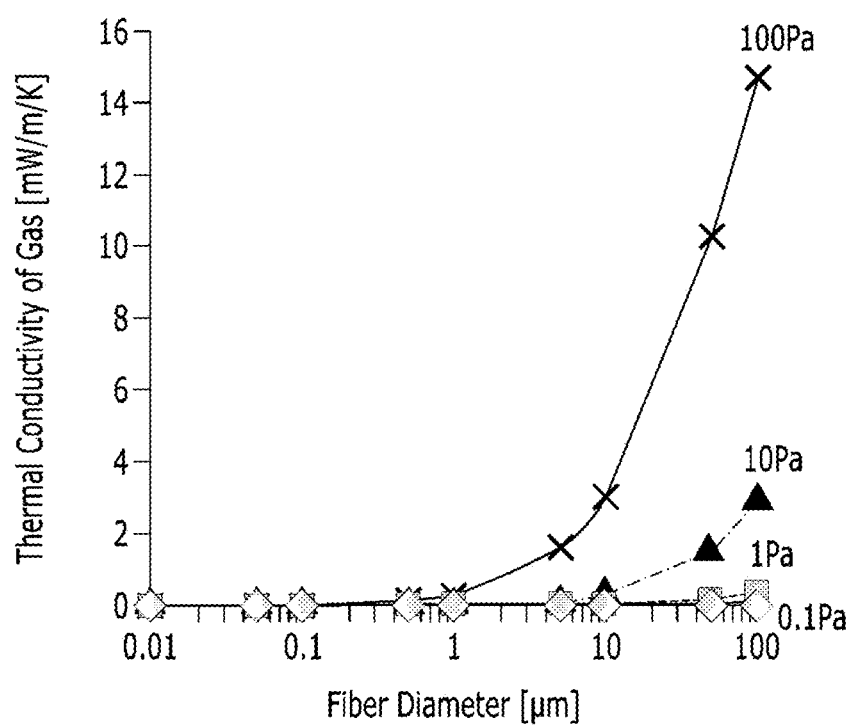
FIG. 3 is a graph showing relationships between the thermal conductivity of gas and a fiber diameter when changing the internal pressure of a vacuum insulation material.

According to exemplary embodiments of the invention, the fiber for a cellulose structure may have a number average fiber diameter of greater than or equal to about 1 nanometer (nm) and less than or equal to about 1 μm. In one exemplary embodiment, for example, the fiber for a cellulose structure may have a number average fiber diameter of greater than or equal to about 1 nm and less than or equal to about 500 nm, or, for example, greater than or equal to about 1 nm and less than or equal to about 200 nm. In such an embodiment, where the number average fiber diameter is greater than or equal to about 1 nm, the fiber strength is obtained by as much as providing high porosity when the cellulose structure includes cellulose fiber. In such an embodiment, when the number average fiber diameter is less than or equal to about 1 μm, the inside gas thermal conductivity is not substantially affected even if the internal pressure of vacuum insulation material is increased up to about 100 Pa, and the contact area between fibers may be suppressed to lower the solid thermal conductivity, as shown in FIG. 3.

According to exemplary embodiments of the invention, the surface of the cellulose structure is observed by a scanning electron microscope ("SEM") (40,000× magnification), 20 cellulose fibers are measured for diameter, and the average thereof is calculated to determine a number average fiber diameter.

Figure 2A:
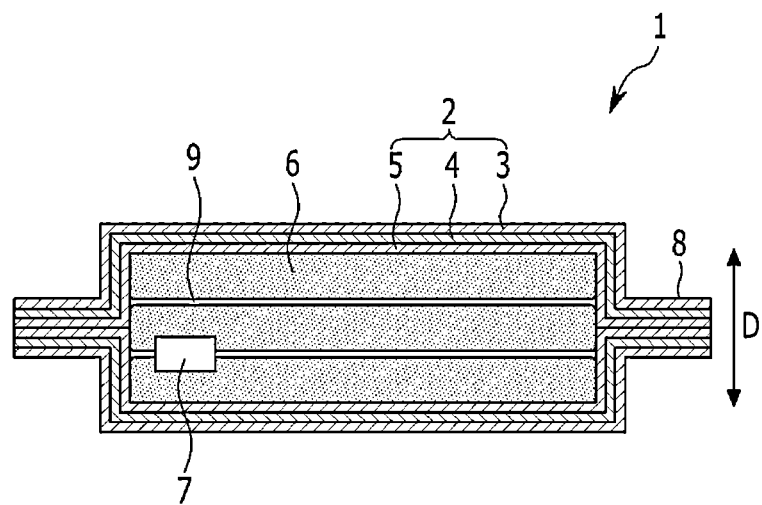
FIGS. 2A and 2B are schematic cross-sectional views of alternative exemplary embodiments of a vacuum insulation material according to the invention.
Figure 2B:
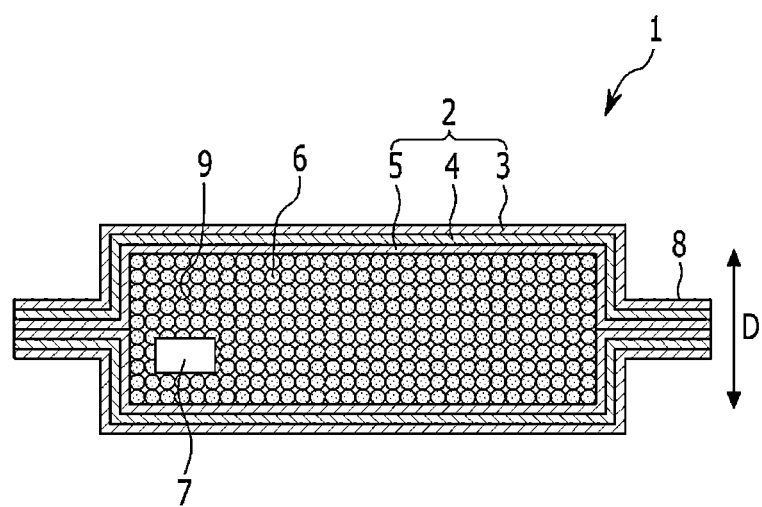

The shape of the cellulose structure is not particularly limited, and may include a sheet shape, a powder-pellet shape, or the like, for example. The core material including the cellulose structure may include a cellulose structure having a single kind of shape or a cellulose structure combination of two or more kinds of shapes. In one exemplary embodiment, for example, the cellulose structure 6 has a sheet-shape as shown in FIG. 2 A, and a plurality of sheet-shaped cellulose structure 6 may be stacked on one another to define a core material. In such an embodiment, the obtained core material may have pores 9 between sheets to effectively prevent the thermal conduction caused by fiber, to thereby reduce the solid thermal conductivity. In an alternative exemplary embodiment, the cellulose structure 6 has a powder-pellet shape as shown in FIG. 2 B, and a plurality of powder-pellet shaped cellulose structures may be introduced into an exterior material 2 and sealed to define a core material. In addition, the powder-pellet material may be preliminarily enclosed by a non-woven fabric or the like to be effectively introduced into the exterior material 2 and sealed. Accordingly, in such an embodiment, the core material may effectively prevent the thermal conduction by pores 9 between particles and may reduce the solid thermal conductivity.

In an exemplary embodiment, the cellulose structure may have a unit length of greater than or equal to about 1 μm and less than or equal to about 5 mm in the heat-insulation direction. In one exemplary embodiment, for example, the cellulose structure may have a unit length of greater than or equal to about 1 μm and less than or equal to about 2 mm, in the heat-insulation direction. In an exemplary embodiment, where the unit length in the heat-insulation direction is less than about 1 μm, the workability may be deteriorated during lyophilizing of the cellulose structure. In an exemplary embodiment, where the unit length in the heat-insulation direction is greater than about 5 mm, the number of laminating core materials may be decreased to deteriorate the blocking effects toward the heat-insulation direction.

In an exemplary embodiment, where the cellulose structure has a powder-pellet shape, the particle diameter of powder-pellet material may be greater than and equal to about 1 μm and less than and equal to about 5 mm. In one exemplary embodiment, for example, the particle diameter of powder-pellet material may be greater than or equal to about 1 μm and less than or equal to about 1 mm, or greater than or equal to about 1 μm and less than or equal to about 500 μm. In an exemplary embodiment, where the powder-pellet material has the ranged particle diameter, the blocking effect in the heat-insulation direction may be further enhanced. The particle diameter of the powder-pellet material may be obtained by observing the surface of the cellulose structure with an optical microscope to measure the diameters of 20 particles, and calculating the average thereof.

According to an exemplary embodiment, where a sheet-shaped cellulose structure is laminated to provide a core material, the unit length of the cellulose structure in the heat-insulation direction means a thickness of one sheet. In an exemplary embodiment, where the core material includes a powder-pellet shaped cellulose structure the unit length of the cellulose structure in the heat-insulation direction means a particle diameter.

In an exemplary embodiment, the vacuum insulation material including a core material having a cellulose structure may have porosity of greater than or equal to about 80%. In one exemplary embodiment, for example, the vacuum insulation material including a core material having a cellulose structure may have porosity of greater than or equal to about 85%, or greater than or equal to about 90% under the reduced pressure of about 1 Pa. In an exemplary embodiment, where the core material has porosity of less than about 80%, the contact area between fibers is substantially enlarged enough to allow heat to be transported through the fiber, thereby increasing the solid thermal conductivity.

In an exemplary embodiment, "porosity" of core material may mean a value calculated by a predetermined method, which will hereinafter be described in detail.

According to an exemplary embodiment, the method of manufacturing a core material may include removing a solvent from the prepared cellulose fiber dispersion or the cellulose powder-pellet shaped dispersion, or the market-available cellulose dispersion, but not being limited thereto.

In such an embodiment, the method of manufacturing a cellulose fiber of the core material may be obtained by boiling the material including cellulose such as wood bark in an alkali solution including such as sodium hydroxide according to a conventional method. The cellulose fiber may be selectively crushed, and the fiber length may be adjusted. In such an embodiment, the market-available cellulose powder or a cellulose dispersion solution or the like may be used.

Then, the dispersion of cellulose fiber is prepared. The concentration of cellulose fiber included in the cellulose dispersion may be in a range from about 0.1 wt % to about 20 wt %, for example, from about 1 wt % to about 10 wt %, based on the cellulose dispersion. In such an embodiment, when the cellulose fiber has a concentration of greater than or equal to about 0.1 wt %, the workability may be sufficient for the lyophilization. In such an embodiment, when the cellulose fiber has a concentration of less than or equal to about 20 wt %, the porosity after the lyophilization is greater than or equal to about 80%, such that the solid thermal conductivity may be suppressed.

The dispersing property of cellulose fiber in the dispersion may be adjusted by appropriately selecting the dispersive medium. In an exemplary embodiment, the dispersive medium may be water, an alcohol-based solvent such as ethanol, 2-propanol, t-butanol, hexanol and the like, a polyhydric alcohol-based solvent such as ethylene glycol, propylene glycol and the like, an ether-based solvent such as diethylether, dioxane, tetrahydrofuran and the like, a halogen-containing organic solvent such as chloroform, trichloroethylene and the like, ketones such as acetone, methylethylketone and the like, an ester-based solvent such as methyl acetate, ethyl acetate and the like, an amine- or amide-based solvent such as triethylamine or N,N-dimethyl formamide and the like, or a combination thereof, but not being limited thereto. In such an embodiment, water may be used in the view of, for example, volatility, freezing point, and an effect on a device in the case of carrying out the lyophilization.

In an exemplary embodiment, a dispersing agent may be selectively added to improve the dispersing property. In such an embodiment, the dispersing agent may include an anionic surfactant, a cationic surfactant, an amphoteric surfactant, a non-ionic surfactant, or a combination thereof, for example. In such an embodiment, the dispersion of cellulose fiber may be adjusted by modifying a substituent of cellulose fiber or the like.

When the cellulose fiber is selectively dispersed, a bead mill, a ball mill, a roll mill, a sand mill, an ultrasonic disperser, a chopper mill, a high pressure homogenizer, a planetary mixer, a grinder or the like may be used.

The prepared dispersion is moved to a container such as a stainless steel vat, and a solvent is removed. In an exemplary embodiment, the removing of the solvent may include lyophilization, vacuum-drying, heating-drying, natural drying or the like, for example, but not being limited thereto. In such an embodiment, lyophilization may be used in the viewpoint of easily maintaining the fiber alignment during the dispersion and providing a cellulose structure having high porosity.

In an exemplary embodiment, where the sheet-shaped cellulose structure is laminated to provide a core material, a container adjusted for the dimensions of the core material during the lyophilization is used; or the dispersion amount is adjusted to provide a desirable thickness for the cellulose structure during the lyophilization, and a sheet-shaped cellulose structure is selectively laminated; and the obtained cellulose structure is used as a core material without forming a shape.

In an exemplary embodiment, where the powder-pellet shaped core material is used, the cellulose structure obtained by lyophilization may be pulverized by a blender or the like to provide a powder-pellet shaped cellulose structure and enclosed by a three-directionally sealed non-woven fabric and sealed in such a fabric, and then the thickness thereof is adjusted to have a predetermined thickness, and the surface is smoothed by a roller to provide a core material. In such an embodiment, the cellulose structure may be obtained by freezing the cellulose fiber dispersion, pulverizing the cellulose fiber dispersion into a powder-pellet material, and lyophilizing the powder-pellet material.

In an exemplary embodiment, the core material may have a plurality of cellulose structures when using a sheet-shaped cellulose structure. In such an embodiment, pores may be defined or provided between a plurality of cellulose structures, and the solid thermal conductivity may be decreased in the heat-insulation direction.

In an exemplary embodiment, the gas adsorption agent adsorbs gasses such as vapor, air (oxygen and nitrogen), and the like, remaining in or entering the closely sealed spaced of the vacuum insulation material. The gas adsorption agent may include any known gas adsorption agents. In one exemplary embodiment, for example, the gas adsorption agent may include a chemical adsorption material such as calcium oxide (quick lime) and magnesium oxide, a physical adsorption material such as zeolite, open-cell polyurethane, a lithium compound, a chemical adsorptive and physical adsorptive copper ion exchange ZSM-5 type of zeolite, molecular sieve 13x, or the like, but not being limited thereto. The gas adsorption agent material may be used singularly or as a mixture of two or more kinds thereof.

In an exemplary embodiment, the exterior material may have a gas barrier, and may include, for example, a laminate film of a barrier layer such as a metal foil or a deposition film and a polymer film. The laminate film may include, for example, a laminate film of a metal foil such as aluminum, iron, gold, silver, copper, nickel, steel use stainless ("SUS"), tin, titanium, platinum, lead, cobalt, zinc, carbon steel, and the like, and/or an alloy foil of a combination thereof; or a deposition film of aluminum, nickel, cobalt, zinc, gold, silver, copper, silicon oxide, alumina, magnesium oxide, titanium oxide, and the liker, and/or an alloy deposition film of a combination thereof; and a polymer film.

In an exemplary embodiment, as shown in FIG. 1, the metal foil 4 and the polymer films 3 and 5 are each in a single layer, but not being limited thereto. In such an embodiment, the metal foil 4 and the polymer film 3 or 5 for an exterior material may be in a single layer or in a laminate form having two or more layers. In an exemplary embodiment, where the metal foil 4 and the polymer film 3 or 5 for an exterior material have a multi-layer structure, the metal foil and the polymer film may have a structure of two or more laminated layers. In such an embodiment, the lamination of the metal foil 4 and the polymer film 3 or 5 may have any form. In one exemplary embodiment, for example, the outmost layer and the innermost layer of the metal foil 4 and the polymer film 3 or 5 may be polymer films to improve adhesion, the surface protection effects, and so on. In such an embodiment, the exterior material may have a laminate form of a polymer film-metal foil-polymer film from the outside.

The exterior material may have high gas barrier properties. In an exemplary embodiment, the barrier layer may have high gas barrier properties to improve barrier properties of the exterior material. In one exemplary embodiment, for example, the vapor permeability of the exterior material may be less than or equal to about $1\times10^{-3}$ gram per square meter per day (g/m²·day), or less than or equal to about $5\times10^{-4}$ g/m²·day. In such an embodiment, where the vapor permeability is less than or equal to about $1\times10^{-3}$ g/m²·day, the exterior material may provide sufficient exterior material gas barrier properties and may maintain the vacuum degree in the vacuum insulation material for the long time. As lower vapor permeability is better, the lower limit thereof is not particularly limited, but may be generally greater than or equal to about $1\times10^{-7}$ g/m²·day.

In an exemplary embodiment, the thickness of the barrier layer may have a thickness of less than or equal to about 20 μm, but not being limited thereto. In such an embodiment, where the thickness of the barrier layer is less than or equal to about 20 μm, the exterior material may have high flexibility and workability on the lamination.

In an exemplary embodiment, the barrier layer may be laminated with a polymer film to provide an exterior material. Herein, the polymer film may have a single layer structure or a multi-layer structure, in which a plurality of single layers are laminated. In such an embodiment, the composition of the polymer film may not be particularly limited. In one exemplary embodiment, for example, the polymer film (polymer film 5 in FIGS. 1A and 1B) at the inner side (the side accommodating the core material or the gas adsorption agent) from the barrier layer may be a film having thermal bonding properties, and the polymer film (polymer film 3 in FIGS. 1A and 1B) at the outside (the side contacting the exterior atmosphere) from the metal foil may be a film having a surface protective effect (surface protective film).

Herein, the thermal bonding film is configured to be adhered by a general sealing method (for example, a heat sealing or an ultrasonic sealing method). In an exemplary embodiment, the material of the thermal bonding film may be, for example, a polyolefin such as low density polyethylene, linear low density polyethylene, high density polyethylene, polypropylene, and the like, a thermoplastic resin such as an ethylene-vinyl acetate copolymer, an ethylene-methacrylic acid copolymer, an ethylene-acrylic acid ester copolymer, an ethylene-acrylic acid ester copolymer, a polyacrylonitrile, or a combination thereof. In such an embodiment, the material may be used singularly or as a mixture of two or more kinds thereof. In such an embodiment, the thermal bonding film may be in a single layer or a laminate of two or more layers. In an exemplary embodiment, where the thermal bonding film has a multi-layer structure, materials of layers thereof may be substantially the same as each other or different from each other.

In one exemplary embodiment, for example, the thermal bonding film may have a thickness of about 10 μm to about 100 μm, but not being limited thereto. In such an embodiment, when the thickness of the thermal bonding film is thinner than about 10 μm, the contact strength may be insufficient on the heat seal or ultrasonic seal, and when is thicker than about 100 μm, the workability such as flexibility may be deteriorated. In an exemplary embodiment, where the thermal bonding film has a laminate structure of two or more layers, the thickness of the thermal bonding film means the total thickness. In such an embodiment, the thickness of each layer of the laminate structure may be substantially the same as or different from each other.

The surface protective film may be the same material generally used as a surface protective film of an exterior material, but not being limited thereto. In an exemplary embodiment, the material of the surface protective film may be, for example, a polyamide (nylon) ("PA") such as nylon-6, nylon-66, and the like, a polyester such as polyethylene terephthalate ("PET"), polyethylene naphthalate ("PEN"), polybutylene terephthalate ("PBT"), and the like, a polyolefin such as polyethylene ("PE"), polypropylene ("PP"), polystyrene ("PS"), and the like, polyimide, poly acrylate, polyvinyl chloride ("PVC"), polyvinylidene chloride ("PVDC"), an ethylene vinyl alcohol copolymer ("EVOH"), a polyvinyl alcohol resin ("PVA"), polycarbonate ("PC"), polyether sulfone ("PES"), polymethyl methacrylate ("PMMA"), polyacrylonitrile resin ("PAN"), and the like. In such an embodiment, the surface protective film may include several additives or stabilizers, for example, an antistatic agent, an ultraviolet ("UV") blocking agent, a plasticizer, a lubricant, or a combination thereof. In such an embodiment, the material may be used singularly or as a mixture of greater than or equal to two kinds thereof. In such an embodiment, the surface protective film may be in a single layer or a laminate of two or more layers. In an exemplary embodiment, where the surface protective film has a multi-layer structure, each layer thereof may have substantially the same composition as or a different composition from each other.

In one exemplary embodiment, for example, the surface protective film may have a thickness ranging from about 10 µm to about 100 µm, but not being limited thereto. In such an embodiment, when the thickness of the surface protective film is within the range of about 10 µm to about 100 µm, the surface protective film may effectively protect the barrier layer and suppress generation of cracks and the like, and may have high workability such as flexibility. In an exemplary embodiment, where the surface protective film has a laminate structure of greater than or equal to two layers, the thickness means the total thickness. In such an embodiment, the thickness of each layer of the laminate structure may be substantially the same as or different from each other.

In one exemplary embodiment, for example, the thickness of the exterior material may range from about 20 µm to about 210 µm, but not being limited thereto. The exterior material having high gas barrier and workability properties in a thin thickness may be used.

In one exemplary embodiment, for example, the method of manufacturing a vacuum insulation material may include preparing two sheets of exterior materials, folding one of the exterior materials (e.g., laminate film) and heat bonding between thermal bonding films disposed in the terminal ends of exterior materials facing each other to provide an envelope-shaped exterior material, injecting a core material and a gas adsorption agent into the exterior material, and heat bonding between the thermal bonding films disposed in the opening of the envelope-shaped laminate film under the reduced pressure, but not being limited thereto. In an alternative exemplary embodiment, the method of manufacturing a vacuum insulation material may include disposing two sheets of exterior materials (laminate film) to face the thermal bonding films to each other, heat bonding between the thermal bonding films disposed in the terminal ends of each exterior material to provide an envelope-shaped exterior material, injecting a core material and a gas adsorption agent into the envelope-shaped exterior material, and heat bonding between the thermal bonding films disposed around the opening of the envelope-shaped laminate film under the reduced pressure, e.g., 1 Pa.

In an exemplary embodiment, as described above, the vacuum insulation material may have low thermal conductivity and may effectively suppress the thermal conduction in the unfavorable direction. Accordingly, in such an embodiment, the vacuum insulation material may be effectively used for a device configured to maintain the heat insulation properties, for example, a freezer, refrigerator, a vending machine, a hot water supply, a heat insulation material for a building, a heat insulation material for an automobile, a thermostatic box, or the like, for example.

The effects of exemplary embodiments herein will now be described with reference to the following examples and comparative examples. However, the technical scope of exemplary embodiments of the invention is not limited to the following examples. Operations described hereinafter are performed at room temperature of about 25° C. unless mentioned otherwise. Herein, unless mentioned otherwise, "%" and "part" refer to "wt %" and "parts by weight", respectively.

EXAMPLE 1

10 wt % of a cellulose nanofiber water dispersion (Daicel Fine Chem) is accommodated in a stainless steel vat in a uniform height of 2 mm, and preliminarily lyophilized at −40° C. using an RLE-103 freezing dryer (manufactured by Kyowa Vacuum Engineering Co., Ltd) and lyophilized at a vacuum degree of 40 Pa and a shelf temperature of 30° C. to provide a cellulose structure. The obtained cellulose structure is laminated in 3 layers to provide a core material of a vacuum insulation material.

Figure 4:
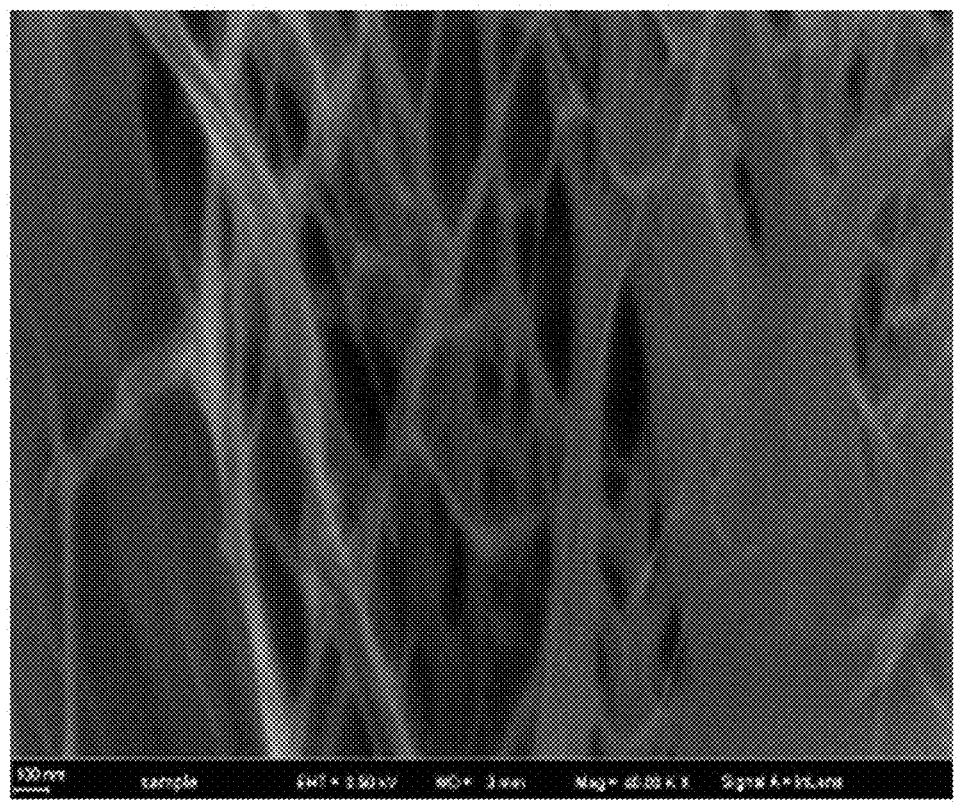
FIG. 4 is a scanning electron microscope ("SEM") image showing a cellulose structure of a vacuum insulation material according to the invention.

When the obtained cellulose structure is observed by SEM (40,000 magnification), a number average fiber diameter (average of 20) thereof is 140 nm (see FIG. 4).

As an exterior material, a polyamide (25 µm), a polyethylene terephthalate film (12 µm), an aluminum foil (7 µm), and a linear low density polyethylene film (50 µm) are dry laminated and attached to each other to provide a laminate film, and quick lime packed in a ventilating package material as a gas adsorption agent is sealed under the reduced pressure to have a vacuum degree of 1 Pa, to provide a vacuum insulation material having a size of 140 mm (width)×220 mm (depth)×6 mm (height.

EXAMPLE 2

The cellulose structure obtained from Example 1 is pulverized using a Wonder Blender (manufactured by Osaka Chemical) to provide a powder-pellet shaped cellulose structure. When the obtained powder-pellet shaped cellulose structure is observed with an optical microscope, the number average particle diameter thereof is 200 µm (average of 20).

The obtained powder-pellet shaped cellulose structure is injected into a non-woven fabric sealed in three directions and compressed to a thickness of 6 mm and sealed, and the surface thereof is smoothed by a roller to provide a core material. A vacuum insulation material is fabricated using the core material in accordance with the same procedure as in Example 1.

COMPARATIVE EXAMPLE 1

A vacuum insulation material is fabricated in accordance with the same procedure as in Example 1, except that 75 sheets of paper having a number average fiber diameter of 20 µm and a thickness of 0.08 mm, which are measured with an optical microscope, are laminated to provide a core material.

COMPARATIVE EXAMPLE 2

A vacuum insulation material is fabricated in accordance with the same procedure as in Example 1, except using a one layered cellulose structure having a height of 6 mm to provide a core material.

<Evaluation 1 Porosity of Vacuum Insulation Material>

The vacuum insulation materials obtained from Examples 1 to 3 and Comparative Example 1 are evaluated for porosity. Specifically, the porosity is calculated from the density of the core material under the reduced pressure of about 1 Pa and the gravity of cellulose (1.6 g/cm$^3$) based on the following formula:

Porosity=(1−density of vacuum insulation material/gravity of cellulose)×100.

<Evaluation 2 Thermal Conductivity of Vacuum Insulation Material>

The 100 mm×100 mm vacuum insulation materials obtained from Examples 1 and 2 and Comparative Examples 1 and 2 are measured for thermal conductivity using a heat flow meter (HFM436 manufactured by NETZSCH), and a ratio thereof is evaluated relative to the case of the thermal conductivity of Comparative Example 1 as assumed to be 1. The results are shown in the following Table 1.

TABLE 1

|  | Porosity (%) | Thermal conductivity ratio (relative to Comparative Example 1) |
|---|---|---|
| Example 1 | 91 | 0.62 |
| Example 2 | 87 | 0.68 |
| Comparative Example 1 | 77 | 1 |
| Comparative Example 2 | 90 | 0.75 |

As shown in Table 1, an exemplary embodiment of the vacuum insulation material according to the invention has high porosity and low thermal conductivity. As described above, a conventional vacuum insulation material, e.g., Comparative Example 1, using a core material of a paper shaped cellulose structure has lower porosity and higher thermal conductivity than exemplary embodiments of the vacuum insulation material including the cellulose structure described herein, e.g., Examples 1 and 2; and a conventional vacuum insulation material, e.g., Comparative Example 2 has higher thermal conductivity than exemplary embodiments of the invention, e.g., Examples 1 and 2, since the blocking toward the heat-insulation direction is not provided in such a conventional vacuum insulation material.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vacuum insulation material comprising:
   a pair of gas barrier exterior materials;
   a core material comprising a cellulose structure having porosity of greater than or equal to about 80% under reduced pressure of about 1 pascal, wherein the cellulose structure has a unit length of greater than or equal to about 1 micrometer and less than or equal to about 5 millimeters in a heat-insulation direction, wherein the heat-insulation direction means a predetermined direction in which the thermal conduction is effectively blocked or substantially lowered when using the heat-insulation material; and
   a gas adsorption agent,
   wherein the core material and the gas adsorption agent are interposed between the pair of gas barrier exterior materials and sealed inside therebetween under reduced pressure.

2. The vacuum insulation material of claim 1, wherein the cellulose structure comprises a cellulose fiber having a number average fiber diameter of greater than or equal to about 1 nanometer and less than or equal to about 1 micrometer.

3. The vacuum insulation material of claim 1, wherein the cellulose structure comprises a powder-pellet shaped cellulose structure having a number average particle diameter of less than or equal to about 5 millimeters.

4. The vacuum insulation material of claim 1, wherein the cellulose structure comprises a sheet-shaped cellulose structure in a layered structure.

5. The vacuum insulation material of claim 4, wherein the cellulose structure comprises two or more sheet-shaped cellulose structures where one sheet is stacked on another, and
   a unit length of the cellulose structure in a heat-insulation direction means a thickness of one sheet.

6. The vacuum insulation material of claim 5, wherein a core material has pores between the sheets.

7. A method of manufacturing the vacuum insulation material of claim 1, the method comprising:
   lyophilizing a cellulose fiber dispersion to provide the cellulose structure.

* * * * *